(12) United States Patent
Mayhew et al.

(10) Patent No.: US 8,832,382 B2
(45) Date of Patent: Sep. 9, 2014

(54) SUB PAGE AND PAGE MEMORY MANAGEMENT APPARATUS AND METHOD

(75) Inventors: David E. Mayhew, Northborough, MA (US); Mark Hummel, Franklin, MA (US)

(73) Assignee: ATI Technologies ULC, Markham, Ontario (CA)

( * ) Notice: Subject to any disclaimer, the term of this patent is extended or adjusted under 35 U.S.C. 154(b) by 144 days.

(21) Appl. No.: 13/332,853

(22) Filed: Dec. 21, 2011

(65) Prior Publication Data

US 2013/0166834 A1    Jun. 27, 2013

(51) Int. Cl.
*G06F 12/12*    (2006.01)

(52) U.S. Cl.
CPC ..................................... *G06F 12/12* (2013.01)
USPC .......................................................... 711/133

(58) Field of Classification Search
CPC ............................ G06F 12/1027; G06F 12/12
See application file for complete search history.

(56) References Cited

U.S. PATENT DOCUMENTS 5,664,159 A * 9/1997 Richter et al. ................... 703/23
6,581,142 B1 * 6/2003 Jacobs ........................... 711/159

FOREIGN PATENT DOCUMENTS

EP    0810527 A1    3/1997

OTHER PUBLICATIONS

Jamrozik, Herve A. et al.; Reducing Network Latency Using Subpages in a Global Memory Environment; Proceedings of the 2004 ACM LCTES '04; New York, NY; vol. 31, No. 9; Sep. 1, 1996.
Cheol Ho Park et al.; Agressive superpage support with the shadow memory and the partial-subblock TLB; Microprocessor and Microsystems, IPC Business Press Ltd.; London, GB; vol. 25, No. 7; Oct. 15, 2001.
International Search Report and Written Opinion; European Patent Office; International Application No. PCT/US2012/071234; dated Apr. 12, 2013.

* cited by examiner

*Primary Examiner* — Hiep Nguyen
(74) *Attorney, Agent, or Firm* — Faegre Baker Daniels LLP

(57) ABSTRACT

A method and apparatus for managing a virtual address to physical address translation utilize a subpage level fault detecting and access. The method and apparatus may also use an additional subpage and page store Non-Volatile Store (NVS). The method and apparatus determines whether a page fault occurs or whether a subpage fault occurs to effect an address translation and also operates such that if a subpage fault had occurred, a subpage is loaded corresponding to the fault from a NVS to a DRAM, such as DRAM or any other suitable volatile memory historically referred to as main memory. The method and apparatus, if a page fault has occurred, determines if a page fault has occurred without operating system assistance and is a hardware page fault detection system that loads a page corresponding to the fault from NVS to DRAM.

20 Claims, 5 Drawing Sheets

SUB PAGE AND PAGE MEMORY MANAGEMENT APPARATUS AND METHOD

BACKGROUND OF THE DISCLOSURE

The disclosure relates generally to systems that employ virtual memory systems and more particularly to systems that employ virtual to physical memory address translation management.

Many computer operating systems such as those used in smart phones, tablet devices, laptops, servers, digital televisions and other devices employ a virtual addressing system wherein physical addresses of memory are mapped to virtual addresses being used by processes executing in the computer operating system. In such systems, every process is given the impression that it is working with large, contiguous sections of memory. In realty, each processes memory may be dispersed across different areas of physical memory or may have been paged out to backup storage such as a hard drive. Systems typically employ, for example, three levels of memory, cache memory, main memory such as DRAM and backup storage typically in the form of a hard drive, or other suitable persistent memory. When a process wishes to obtain information from memory, the information may be stored in the main memory. However, if it is not and must be obtained from the hard drive (which may be flash memory based), it can take as long as 20 milliseconds to respond to a request to obtain a 2 megabyte page to the hard drive.

This occurs, for example, when the CPU (central processing unit) uses the operating system to determine a page fault which means that the memory page being sought by the process is not in the main memory so the CPU needs to obtain the information from the hard drive source. If the page is not in the main memory, the page fault must be corrected by obtaining the page from the hard drive. For example, a driver executing on the CPU may pause an application so that a page may be obtained from the hard drive and placed in main memory. A page table is updated and the application is restarted. A problem can arise during context switches to load virtual address page fault routines since the CPU must carry out an access to a physical disk or persistent storage system in which the access time associated with locating the data and its transmission time once it is located may be significant (e.g., 20 milliseconds or more). Virtual memory paging structures are based on a complex relationship between three factors: (1) the likelihood that data locality will use more data, contiguous to the target data, (2) the amount of time it takes to access the target data, plus as much more as is deemed effective, and (3) the time it takes to transfer the target data to memory. The assumption that the hard drive access will take a very long time and hence the amount of data collected per access can be relatively large because access latency dominates transfer latency (currently, data transmission times for the hard drive are five or more orders of magnitude less than the data access times). Conversely, smaller page sizes allow more pages to be placed in the same memory footprint, increasing the relative effectiveness of the memory (fewer unneeded bytes of storage have been fetched in association with needed storage bytes. Conversely, smaller pages require more page mapping overhead (larger/deeper page tables) which also decreases a translation look aside buffer's effectiveness.

The CPU's memory management unit stores a cache of recently used mappings from the operating system's page table referred to as a translation look aside buffer (TLB). A page table is the data structure used by a virtual memory system to store the mapping between virtual addresses and physical addresses. When a virtual address needs to be translated into a physical address, the TLB is searched first. If a match is found, the physical address is returned and memory access can continue. However, if there is no match, the hardware (or sometimes a software driver or handler) in the CPU will look-up the address mapping in the page table to see whether a mapping exists by performing a page table walk. If a mapping exists in the page table, the mapping is written back to the TLB and the faulting instructions are restarted. The subsequent translation will find a TLB hit and the memory access will continue.

The page table holds the mapping between a virtual address of a page in the address of a physical block of memory. There is also additional information about the page such as a present bit (indicating whether the associated data is in memory or is still on the disk), a dirty bit (indicating that the associated data has been modified and will need to be copied back onto disk before the page can be re-allocated), and, if present, the address of the associated page in memory. Hard drive memory also referred to as secondary storage can be used to augment the physical memory and pages can be swapped in and out between the main memory and the hard drive. The present bit can indicate what pages are currently present in the main memory or those that are on the hard drive and communicate how to treat these different pages such as whether to load a page from the hard drive and swap another page into main memory out. These are well known operations.

However, there are page faults if the page table lookup targets a page that is not resident in the main memory. This could occur, for example, if the page had been swapped out of main memory to make room for another page or if the page is swapped to secondary backup store such as a hard drive. When this happens, the page needs to be taken from the secondary backup store (e.g., hard drive) and put back into the main memory. When physical memory is full, a page in physical memory needs to be swapped out to make room for the requested page. The page table needs to be updated to mark that the page that were previously in the physical memory is no longer there and to mark that the page that was on the hard disk is now on the physical or main memory. The TLB also needs to be updated, including removal of the swapped out page from it and the instruction is restarted.

The current paging scheme is optimized for memory architectures that have very high disk access latencies relative to memory access latencies. The optimizations will not be realized/effective if there is a fundamental change in the relationship between primary storage (memory) and secondary storage (disk) latencies. New memory architectures will require new management structures to realize their full potential.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
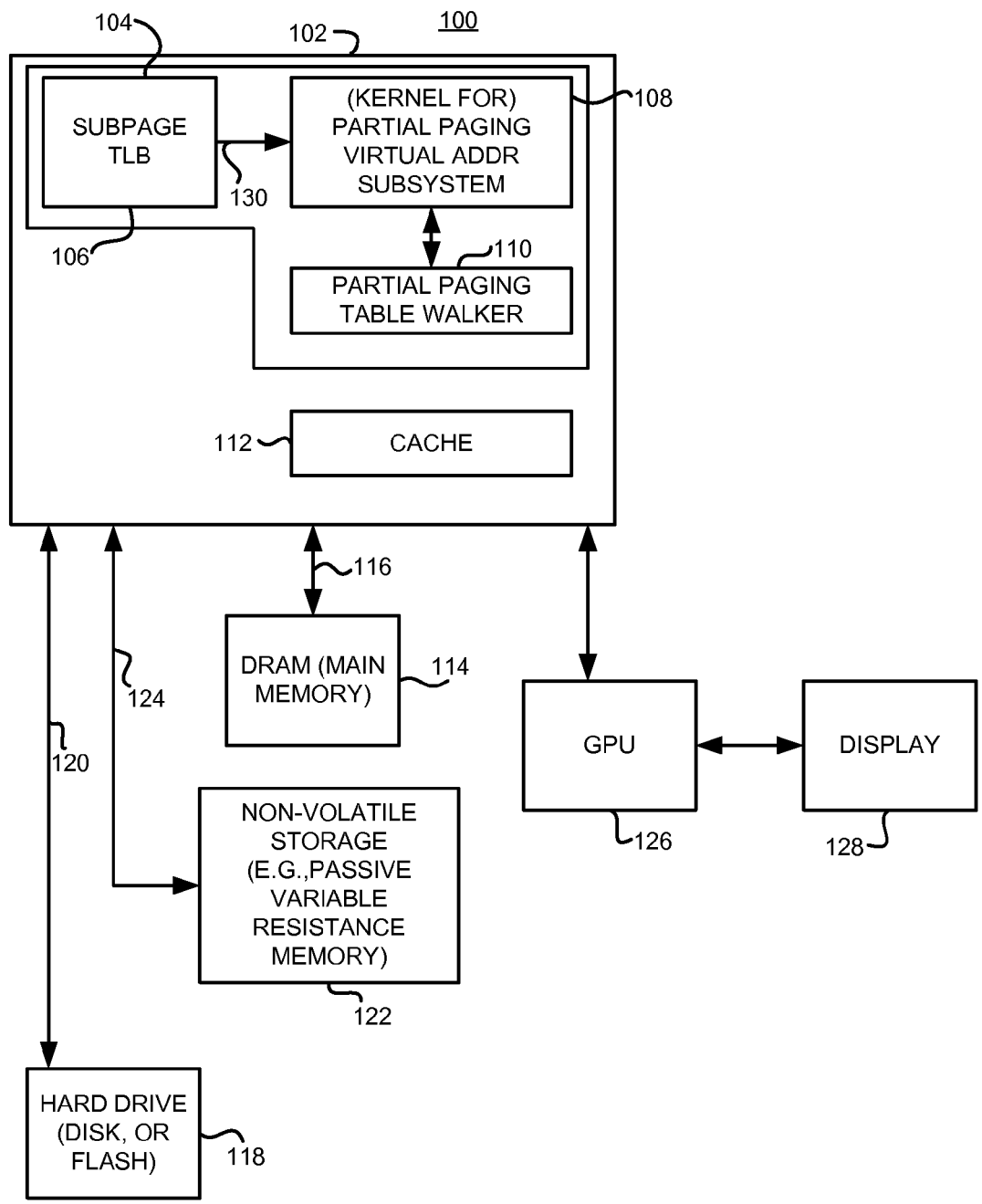
FIG. 1 is a block diagram illustrating one example of an apparatus that employs management of a virtual address to physical address translation in accordance with one embodiment of the disclosure.

Briefly, a method and apparatus for managing a virtual address to physical address translation that utilizes page and subpage level fault detecting and access. This methodology is based on the addition of a new level of storage in the memory hierarchy between DRAM (main memory) and disk, called the Non-Volatile Storage (NVS) level. NVS may be smaller and faster than disk and larger and slower than memory (DRAM). In this method, the legacy page fault mechanism is employed between disk and NVS and a new methodology is employed between NVS and DRAM. The legacy "main memory" nomenclature will subsume both NVS and DRAM. In this new memory hierarchy, a page fault occurs if a targeted memory location is not present in NVS and a subpage fault occurs if a subpage is not in DRAM. The method and apparatus determines whether a page fault occurs or whether a subpage fault occurs to effect an address translation. The method and apparatus also operates such that if a subpage fault has occurred, such as through a hardware subpage fault detection system, a subpage is loaded corresponding to the fault from NVS to DRAM (or any other suitable volatile memory). The method and apparatus, if a subpage fault has occurred, determines if a subpage fault has occurred without operating system assistance and is a hardware subpage fault detection system that loads a subpage corresponding to the fault from NVS to DRAM. A subpage may be any suitable size that is smaller than its associated page size.

Among other advantages, a passive NVS store may be utilized in addition to main memory and to hard drive memory, if desired, and a subpage level and page level fault detection mechanism allows for a faster loading of memory page or subpages to main memory from an NVS.

In determining whether a subpage fault has occurred, the method and apparatus may check an Embellished Translation Look-aside Buffer (ETLB) (also referred to herein as a subpage translation look aside buffer) to effect the address translation and if the subpage fault occurs based on checking the ETLB, the method and apparatus may trigger a hardware subpage fault. In response to the hardware subpage fault, the method and apparatus updates the ETLB to reflect the loading of a subpage corresponding to the fault from the NVS to DRAM. For page table updating, the method and apparatus may populate, based on loading the page stored in the NVS, an address page table with updated address entry information for an entry containing subpage level validity information for each possible subpage. For subpage TLB updating, the method and apparatus may populate, based on loading the subpage stored in NVS, a subpage map with updated address entry information for an entry containing subpage level residency information and dirty information for the corresponding subpage.

The method and apparatus may determine if a desired subpage (or subpages) is present in the NVS based on the subpage map and if the subpage is not present, the method and apparatus may trigger a hardware subpage fault and load the desired subpage from the NVS based on a hardware subpage fault. This is done without stalling the application and without the operating systems' knowledge.

FIG. 1 illustrates one example of an apparatus 100 operative to manage a virtual address to physical address translation. In this example, the apparatus is any suitable computing device such as but not limited to a handheld device, a laptop, HD television, server or any other suitable device that employs virtual to physical address translation. For purposes of illustration only, the apparatus 100 will be described as a computer having a processor 102 such as a CPU. The processor includes a logic 104 that in this example includes a partial paging (subpage) translation look aside buffer 106 implemented in hardware, a partial paging virtual address subsystem 108 and a partial paging table walker 110. This logic may be in addition to the conventional logic employed in virtual to physical address translation systems if desired.

The apparatus may also include a cache memory 112 that may be, for example, on the processor 102, main memory 114 such as volatile memory such as DRAM or any other suitable memory that is accessible to the processor through one or more suitable buses 116 as known in the art. The apparatus also includes secondary memory such as non-volatile memory 118 such as a hard drive in disk form or flash memory form or any other suitable form also in communication with the CPU through one or more suitable buses as known the art 120. In addition, the apparatus includes a low latency persistent memory such as NVS 122 that is in communication with the processor 102 through any suitable communication link 124.

It will be understood that NVS is a term used to describe any memory technology that is not mechanical in its operation and that maintains its state without the continuous application of power. These types of memory are said to be "non-volatile" due to the fact that they retain state information following a power loss or power cycle. Passive variable resistive memory is a type of NVS and is also known as resistive non-volatile random access memory (RNVRAM or RRAM).

Examples of NVS, include, but are not limited to, Ferroelectric RAM (FeRAM), Magnetoresistive RAM (MRAM), Memristors, PRAM, Phase Change Memory (PCM), and Spin-Torque Transfer MRAM (STT-MRAM).

Phase change memory (PCM) is a NVS technology that relies on the properties of a phase change material, generally chalcogenides, to store state. Writes are performed by injecting current into the storage device, thermally heating the phase change material. An abrupt shutoff of current causes the material to freeze in an amorphous state, which has high resistivity, whereas a slow, gradual reduction in current results in the formation of crystals in the material. The crystalline state has lower resistance than the amorphous state; thus a value of 1 or 0 corresponds to the resistivity of a cell. Varied current reduction slopes can produce in-between states, allowing for potential multi-level cells. A PCM storage element consists of a heating resistor and chalcogenide between electrodes, while a PCM cell is comprised of the storage element and an access transistor.

Memristors are commonly referred to as the "fourth circuit element," the other three being the resistor, the capacitor, and the inductor. A memristor is essentially a two-terminal variable resistor, with resistance dependent upon the amount of charge that passed between the terminals. Thus, a memristor's resistance varies with the amount of current going through it, and that resistance is remembered even when the current flow is stopped.

If desired, the apparatus may also include one or more coprocessors 126 such as a graphics processing unit and a display 128 that displays image information provided by the graphics processing unit or CPU if desired. Input/output devices and other known elements including wireless transceivers are not shown for purposes of simplicity. The logic 104 may be any suitable logic configuration including but not limited to one or more state machines, one or more digital signal processors, processors that execute kernels, or any other suitable structure as desired. As further described below, the system employs a page and subpage virtual to physical addressing mechanism. Subpage faults are detected using, for example, the hardware partial paging TLB 106 and page faults undetected are also detected through a hardware page fault detection scheme without operating system assistance. This can ensure highly efficient page updating and subpage transfer from the large NVS 122 compared with software page accesses normally performed for page movement from hard drive 118. Other advantages will be recognized by those of ordinary skill in the art.

Figure 2:
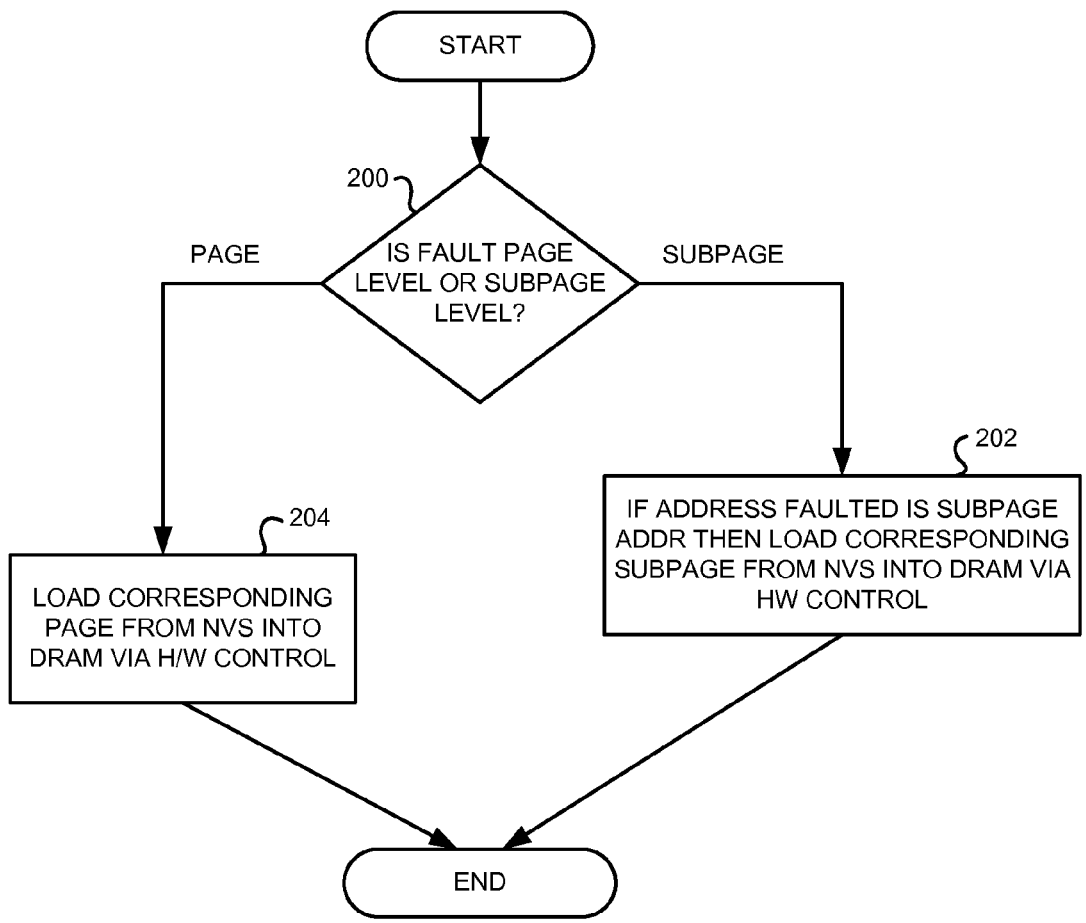
FIG. 2 is a flowchart illustrating one example of a method for mapping a virtual address to physical address translation in accordance with one example set forth in the disclosure.

Referring also to FIG. 2 which is also a flowchart illustrating one example of a method for managing a virtual address to physical address translation carried out for example by the logic 104 includes determining whether either a page fault or subpage fault has occurred to effect an address translation as shown in block 200. If a subpage fault has occurred, the method includes loading a subpage corresponding to the fault from the NVS 122 to the DRAM or main memory 114. This is shown in block 202. If a page fault has occurred, the method includes loading a page corresponding to the fault from the NVS 112 to DRAM 114 as shown in block 204. The method continues when a process is executed via execution of an application or other suitable process executing on the processor 102 is desirous of obtaining data from memory including cache 112.

The partial paging virtual address subsystem logic 108 is responsible for updating embellished page table entries and for coordinating movement subpages from the NVS 122 to the DRAM 114 when a subpage fault is detected. The apparatus 100 includes conventional operating system level page recovery from the hard drive 118 to NVS 122 when a targeted page is located on disk 118.

Figure 3:
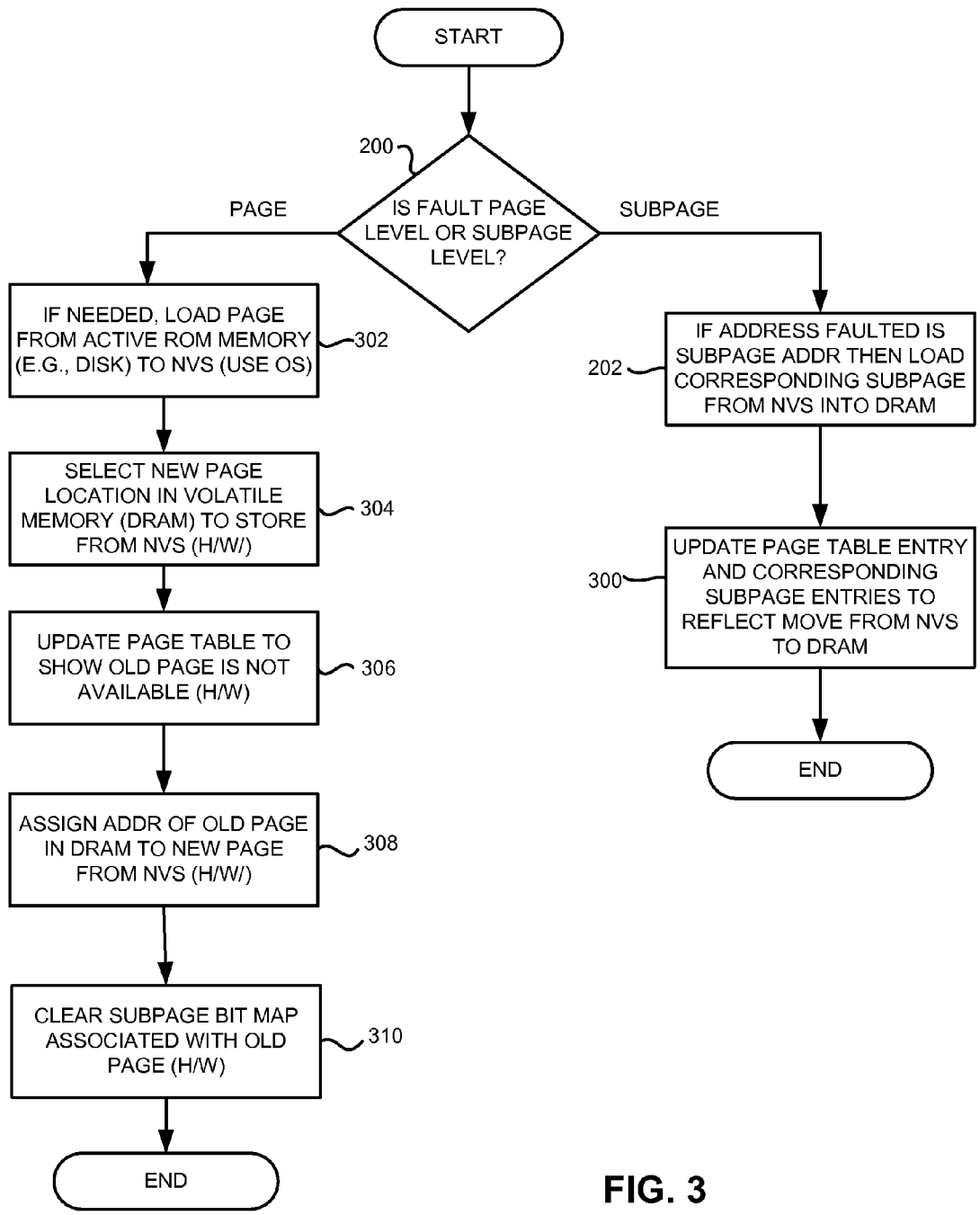
FIG. 3 is a flowchart illustrating one example of a method for mapping a virtual address to physical address translation in accordance with one example set forth in the disclosure.
Figure 4:
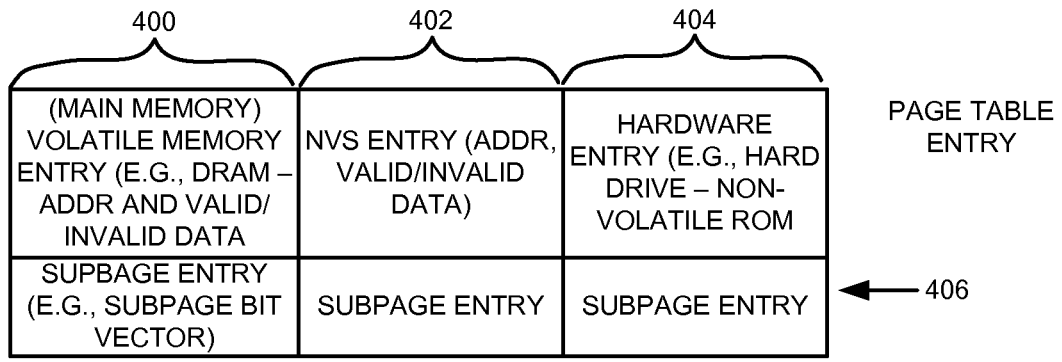
FIG. 4 is an illustration of a page table entry in accordance with one example set forth in the disclosure.

Referring also to FIGS. 3 and 4, the operation of the logic 104 will be described further. Although the operation may be applicable to any subpage size that is smaller than its associated page size, for illustrative purposes, it will be assumed that a page size of 64×1024 bytes is selected and a subpage size of 512 bytes is selected. Using this exemplary structure, a DRAM 114 would contain size aligned blocks of 64×1024 byte pages, each of which contains 32 subpages. Page table and TLB look-ups reflect this large page size (relative to a 4096 byte page size, a TLB will map 16 times as much memory and each entry will be 4 bits smaller). However, while the address mapping is managed on large pages, data is transferred between NVS and DRAM based on subpages. There are two reasons for this mechanism: (1) access to a non-resident subpage is relatively quick (only 2 to 5 times slower than the DRAM itself) and (2) the time it takes to transfer bytes from the NVS to the DRAM has a significant impact on subpage fault resolution (the associated program/process stalls for both access latency and transfer latency and as transfer latency increases (relative to access latency) its effects become more noticeable, and if the transfer includes largely speculatively transferred data, then completing the operation quickly with relatively less speculative data is superior to completing the operation relatively more slowly with relatively more speculatively transferred data. The ETLB will require the addition of a pair of state bits for each subpage: one bit that indicates whether the associated subpage has been transferred from NVS to DRAM and another bit that indicates whether the associated subpage has been modified and will require a write back into NVS before the containing page can be reallocated. (See FIG. 5). These bits may be referred to as a subpage entry and may be in the form of a bitmap as part of an embellished page table entry 110.

In the above example, a page contains 32 subpages, requiring 1024 bits (8 bytes) of additional subpage state storage, 32-40 bits of DRAM address (the address of the associated page in DRAM), plus the normal page table state (principally the address of the associated page in NVS). On a per byte basis, this is much smaller than the storage that would otherwise be represented in a system with a 4096 byte page size (1 address plus state bits per 4096 byte page versus two addresses per 64×1024 byte page and 2 bits per sub page), and has the added advantage of decreasing the depth of an associated search tree, increasing efficiency of translation of the side buffers and decreasing the time required to resolve a page fault.

A page is allocated by creating a mapping between a page's location on the hard drive 118 and the page's location in the NVS. Once this mapping has been established, all subpage faults, and NVS to DRAM page faults can be resolved in hardware. A memory look-up that resolves to a specific memory page checks the subpage bits associated with the desired subpage. If the subpage is present, meaning that the present flag in a subpage entry indicates that the subpage has been loaded, then the subpage address is returned and the mechanism looks like conventional paging mechanisms, except for the subpage status bit check. If the desired subpage is not present in its associated page, the associated present flag indicates that the line has been loaded, then the NVM interface is used to pull the desired subpage from NVS 122. Given that the action associated with the subpage retrieval is expected to be a sub-microsecond operation, it will be more efficient to stall the associated processing than it is to attempt a software based recovery (the requisite context switch overhead required to start a software based operation requires tens of microseconds independent of the operation itself). When a page is retrieved, the associated present flag is updated.

Flushing a page from DRAM also requires that all "dirty" subpages be written back to NVS. Tracking modification on a subpage basis rather than a page basis can greatly decrease the overhead associated with copy-on-write operations.

As to the subpage operation, reference will be made, for example, to FIGS. 3-5. As shown in FIG. 3, determining whether a page fault or a subpage fault has occurred includes checking a subpage (also referred to as partial page) translation look aside buffer 106 to effect the address translation. The subpage translation look aside buffer 106 has both a page entry and corresponding subpage map and checks the page entry to see if the requested page is in the cache 112 as with conventional systems. However, in addition, the partial paging TLB 106 also evaluates a subpage map if a page entry indicates that the page is available to see if a subpage is available. If a subpage is not available then the partial paging TLB 106 triggers are hardware subpage fault to load the subpage from the NVS 122 to the DRAM 114. This is shown in blocks 200 and 202 as previously mentioned. In response to the hardware subpage fault shown as subpage fault data 130, the partial paging virtual address subsystem 108 updates the subpage translation look aside buffer 106 to reflect the loading of the subpage corresponding to the fault from the NVS to the DRAM 114 as shown in block 300. Accordingly, subpage may be moved from the NVS 122 to DRAM 114 without needing to perform a hard drive access through using an operating system.

In addition to updating the partial paging TLB 106 (ETLB) with the subpage information the method includes for example, populating a page table entry, as shown in FIG. 4, a page table entry for each of the respective memories including main memory 114 shown as 400, passive variable resistance entry 402 and hard drive entry 404. The page table entries for each of the respective memories also include a subpage entry generally designated at 406 for each of the memories.

Figure 5:
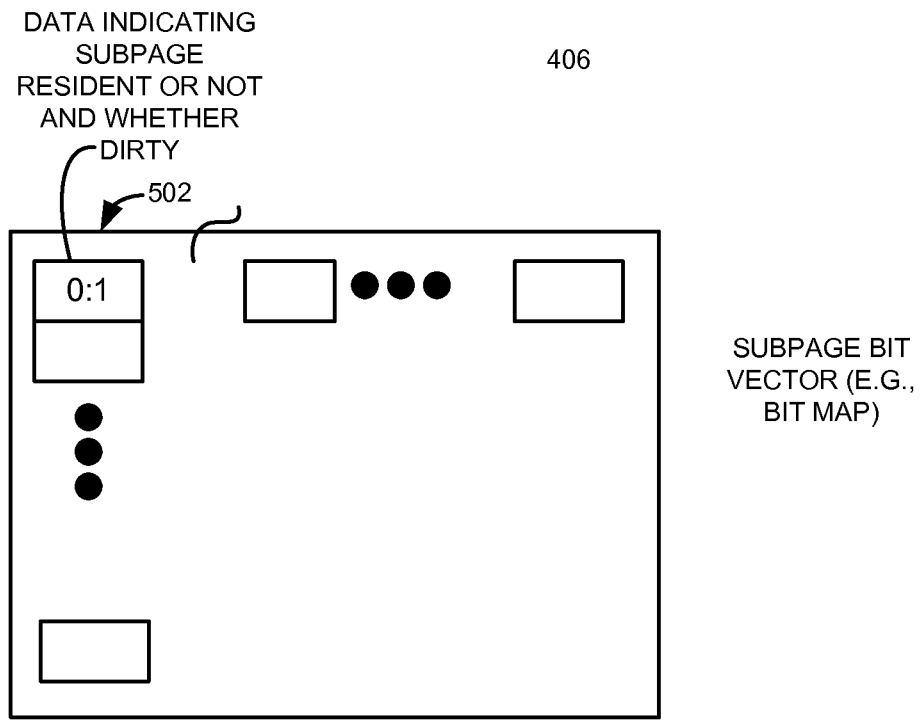
FIG. 5 is a diagram illustrating one example of a subpage entry in accordance with one example set forth in the disclosure.

FIG. 5 illustrates one example of a subpage entry 406 for a given page, also referred to as a subpage bit vector. The subpage entry is a bitmap for example that is populated based on loading of the subpage that is stored in the NVS (and is also referred to as subpage bitmap) and includes corresponding subpage level residency information and dirty information for the corresponding subpages of a page generally shown as bits 502. A page for example includes a plurality of subpage entries (e.g., 16) corresponding to the subpages of each page. The page table entries accordingly include subpage entries as well as a NVS entry on a page level.

When a subpage is removed from the NVS, a subpage in the NVS is moved to the DRAM as a subpage when a subpage fault has been detected. The method may include determining if the desired subpage is present in the NVS 114 based on the subpage map in the page table and if the subpage is not present, the method includes triggering a hardware subpage fault for example by the partial paging virtual address subsystem 108 and loading the desired subpage from the NVS to the DRAM. This is done without stalling the application and without operating system knowledge. Hence, this is done independent of the operating system.

Referring back to FIG. 3, if a page fault is detected, as shown in block 302, if needed the method can include loading a page from the hard drive 118 to the NVS 122 using, for example, the operating system in a similar manner as conventional systems operate today such that the application requesting access to the memory may be temporarily paused by the OS to effect the page movement from the hard drive 118 to the NVS 122. However, any other suitable mechanism may be employed. However if the page is located in the NVS, as shown in block 304, the method includes selecting the new page location in the DRAM 114 to store the page from the NVS 122. As shown in block 306, in this case, the method includes populating, based on loading a page stored in the NVS, the address page table with updated address entry information for an entry containing subpage level validity information for each of the volatile page memory space in the main memory as well as the NVS space in the space of the hard drive as shown in FIG. 4. The updating of the page table to show that the old page is not available is performed by the hardware partial paging virtual address subsystem 108 as was the operation in block 304 to avoid operating system assistance.

Referring back to FIG. 3, after the page table is updated to show that the old page is no longer available in the NVS, the method includes as shown in block 308 assigning the address to the old page in the DRAM to the new page from the NVS. This is also done by the partial paging virtual address subsystem 108. As shown in block 310, the method includes clearing the subpage bitmap associated with the old page which is also done by updating the page table by the partial paging virtual address subsystem 108. The method continues as needed to facilitate additional page fault accommodation.

Figure 6:
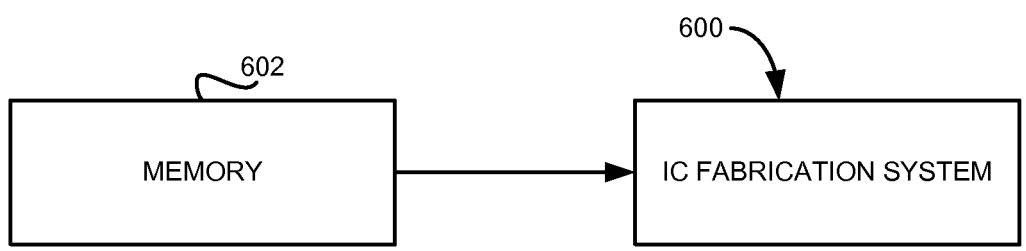
FIG. 6 is a block diagram illustrating one example of an integrated circuit fabrication system.

As shown in FIG. 6, an integrated circuit fabrication system 600 is shown which may include access to memory 602 which may be in any suitable form and any suitable location accessible via the web, accessible via hard drive or any other suitable way. The memory 602 is a non-transitory computer readable medium such as but not limited to RAM, ROM, and any other suitable memory. The IC fabrication system may be one or more work stations that control a wafer fabrication to build integrated circuits. The memory 602 may include thereon instructions that when executed by one or more processors causes the integrated circuit fabrication system to fabricate an integrated circuit that includes the logic described herein.

The disclosed integrated circuit designs may be employed in any suitable apparatus including but not limited to, for example, printers, high definition televisions, handheld devices such as smart phones, tablets, portable devices such as laptops or any other suitable device. Such devices may include for example, a display that is operatively coupled to the integrated circuit where the integrated circuit may be, for example, a GPU, CPU or any other suitable integrated circuit that provides image data for output on the display. Such an apparatus may employ the integrated circuits as noted above including the active memory circuit and memory state backup circuits as described as well as one or more of the described configurations.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that causes the one or more integrated circuit design systems to produce an integrated circuit. The integrated circuit includes logic operative to determine whether a page fault or subpage fault has occurred to effect an address translation and if a subpage fault has occurred, load a subpage corresponding to the fault from NVS to DRAM and if a page fault has occurred, load a page corresponding to the fault from NVS to DRAM.

Among other advantages, a NVS store may be utilized in addition to main memory and to hard drive memory, if desired, and a subpage level and page level fault detection mechanism allows for a faster loading of memory page or subpages to main memory from a NVS. The subpage retrieval may be on a sub-microsecond level which can allow the stalling of an associated application to occur without undue delays.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for managing a virtual address to physical address translation comprising:

determining whether a page fault or sub-page fault has occurred to effect an address translation;

if a sub-page fault has occurred, loading a sub-page corresponding to the fault from non-volatile storage (NVS) to dynamic random access memory (DRAM); and if a page fault has occurred, loading a page corresponding to the fault from NVS to DRAM.

2. The method of claim 1 wherein determining whether a page fault or sub-page fault has occurred comprises checking a sub-page translation look aside buffer (STLB) to effect the address translation, and wherein the method includes:

if the sub-page fault occurs based on checking the STLB, triggering a hardware sub-page fault; and in response to the hardware sub-page fault, updating the sub-page translation look aside buffer to reflect the loading of the sub-page corresponding to the fault from NVS to DRAM.

3. The method of claim 1 comprising populating, based on loading the page stored in the NVS, an address page table with updated address entry information for an entry containing page level validity information for each of at least: volatile page memory space, NVS space and non-volatile memory space.

4. The method of claim 1 comprising populating, based on loading the sub-page stored in the NVS, a sub-page map with updated address entry information for an entry containing sub-page level residency information and dirty information for the corresponding sub-page.

5. The method of claim 4 comprising storing subpages in the DRAM that comprise only a portion of the associated page in the NVS.

6. The method of claim 5 comprising determining if desired subpage is present in DRAM space based on the subpage map and if the subpage is not present, triggering a hardware subpage fault and loading the desired subpage from the NVS based on the hardware subpage fault.

7. The method of claim 1 wherein loading the page corresponding to the fault includes loading the page from a hard drive to the NVS.

8. An apparatus operative to manage a virtual address to physical address translation comprising:

logic operative to determine whether a page or sub-page fault has occurred to effect an address translation; if a subpage fault has occurred, load a subpage corresponding to the fault from NVS to DRAM; and if a page fault has occurred, load a page corresponding to the fault from NVS to DRAM.

9. The apparatus of claim 8 comprising:

the DRAM;

the NVS; wherein the logic is operatively coupled to the DRAM and the NVS and wherein the logic is operative to check a subpage translation look aside buffer (STLB) to effect the address translation, and operative to:

if the subpage fault occurs based on checking the STLB, trigger a hardware subpage fault; and in response to the hardware subpage fault, update the subpage translation look aside buffer to reflect the loading of the subpage corresponding to the fault from NVS to DRAM.

10. The apparatus of claim 8 wherein the logic is operative to populate, based on loading the page stored in the NVS, an address page table with updated address entry information for an entry containing page level validity information for each of at least: volatile page memory space, NVS space and non-volatile memory space.

11. The apparatus of claim 8 wherein the NVS in comprised of passive variable resistance memory.

12. The apparatus of claim 8 wherein the logic is operative to populate, based on loading the subpage stored in the NVS, a subpage bit vector map with updated address entry information for an entry containing subpage level residence information and dirty information for the corresponding subpage.

13. The apparatus of claim 8 wherein the logic is operative to store a subpage in the NVS.

14. The apparatus of claim 12 wherein the logic is operative to determine if a desired subpage is present in DRAM based on the subpage map and if the subpage is not present, triggering a hardware subpage fault and loading the desired subpage from the NVS based on the hardware subpage fault.

15. A non-transitory computer readable medium comprising executable instructions that when executed causes an integrated circuit fabrication system to fabricate an integrated circuit that comprises:

logic operative to determine whether a page fault or sub-page fault has occurred to effect an address translation; if a subpage fault has occurred, load a subpage corresponding to the fault from NVS to DRAM; and if a page fault has occurred, load a page corresponding to the fault from NVS to DRAM.

16. The computer readable medium of claim 15 comprising executable instructions that when executed causes the IC fabrication system to fabricate an integrated circuit comprising the NVS; wherein the logic is operatively coupled to the NVS and wherein the logic is operative to check a subpage (partial page) translation look aside buffer (TLB) to effect the address translation, and operative:

if the subpage fault occurs based on checking the subpage TLB, to trigger a hardware subpage fault; and in response to the hardware subpage fault, update the subpage translation look aside buffer to reflect the loading of the subpage corresponding to the fault from NVS to a DRAM.

17. The computer readable medium of claim 15 comprising executable instructions that when executed causes the IC fabrication system to fabricate an integrated circuit operative to populate, based on loading the page stored in the NVS, an address page table with updated address entry information for an entry containing page level validity information for each of at least: DRAM and NVS spaces.

18. The computer readable medium of claim 17 comprising executable instructions that when executed causes the IC fabrication system to fabricate an integrated circuit operative to populate, based on loading the sub-page stored in the NVS, a sub-page bit vector map with updated address entry information for an entry containing sub-page level residency information and dirty information for the corresponding sub-page.

19. The computer readable medium of claim 15 comprising executable instructions that when executed causes the IC fabrication system to fabricate an integrated circuit operative to store a subpage as a subpage in the NVS to the DRAM as a subpage.

20. The computer readable medium of claim 18 comprising executable instructions that when executed causes the IC fabrication system to fabricate an integrated circuit operative to determine if a desired subpage is present in DRAM space based on the subpage map and if the subpage is not present, triggering a hardware subpage fault and loading the desired subpage from the NVS based on the hardware subpage fault.

* * * * *